United States Patent
Rangoni et al.

(10) Patent No.: US 8,423,782 B2
(45) Date of Patent: Apr. 16, 2013

(54) METHOD FOR AUTHENTICATING A USER ACCESSING A REMOTE SERVER FROM A COMPUTER

(75) Inventors: Gabriel Rangoni, Auriol (FR); Jerome Sion, Paris (FR); Edouard Lafargue, Paris (FR)

(73) Assignee: Gemalto SA, Meudon (FR)

( * ) Notice: Subject to any disclaimer, the term of this patent is extended or adjusted under 35 U.S.C. 154(b) by 371 days.

(21) Appl. No.: 12/740,655

(22) PCT Filed: Aug. 27, 2008

(86) PCT No.: PCT/EP2008/061245
§ 371 (c)(1),
(2), (4) Date: Apr. 29, 2010

(87) PCT Pub. No.: WO2009/056374
PCT Pub. Date: May 7, 2009

(65) Prior Publication Data
US 2010/0263033 A1   Oct. 14, 2010

(30) Foreign Application Priority Data
Oct. 29, 2007   (EP) .................................. 07301510

(51) Int. Cl.
*H04L 29/06*   (2006.01)
*H04L 9/32*   (2006.01)
*G06F 21/00*   (2006.01)
*G06F 7/04*   (2006.01)

(52) U.S. Cl.
USPC ............... 713/182; 713/150; 713/169; 726/2; 726/27

(58) Field of Classification Search ...... 726/6; 713/150, 713/169, 182
See application file for complete search history.

(56) References Cited

U.S. PATENT DOCUMENTS

| | | | |
|---|---|---|---|
| 6,259,909 B1 * | 7/2001 | Ratayczak et al. | 455/411 |
| 7,275,158 B2 * | 9/2007 | Akama | 713/171 |

(Continued)

FOREIGN PATENT DOCUMENTS

| | | |
|---|---|---|
| WO | WO 00/03316 A1 | 1/2000 |
| WO | WO 03/063411 A1 | 7/2003 |

OTHER PUBLICATIONS

Takeshi Yoneda, "Information Security Technologies for Mobile Phones (User Authentication and Information Protection for Mobile Phones)" Mitsubishi Electric Advance, Jun. 2005, pp. 15-18.

(Continued)

*Primary Examiner* — Mohammad W Reza
(74) *Attorney, Agent, or Firm* — Buchanan Ingersoll & Rooney PC

(57) ABSTRACT

The invention relates to a method for authenticating a user accessing a remote server from a computer. The method comprises connecting to the remote server from the computer; logging into the remote server using a user-specific identifier; authenticating the remote server in the computer; sending an unpredictable message from the remote server to the computer; establishing communication between the remote server and a terminal belonging to the user; authenticating the remote server in the terminal; authenticating the terminal in the remote server; inviting the user to enter the unpredictable message in the terminal; using the terminal to send the message entered by the user in the terminal to the remote server; and if the message entered by the user in the terminal matches the unpredictable message, authenticating the user in the remote server.

13 Claims, 1 Drawing Sheet

U.S. PATENT DOCUMENTS

| | | | |
|---|---|---|---|
| 7,631,186 B2 * | 12/2009 | Okabe | 713/168 |
| 8,056,125 B2 * | 11/2011 | Hirose | 726/12 |
| 2002/0038422 A1 * | 3/2002 | Suwamoto et al. | 713/172 |
| 2002/0177433 A1 | 11/2002 | Bravo et al. | |
| 2003/0159031 A1 | 8/2003 | Müller et al. | |
| 2006/0265262 A1 * | 11/2006 | Kamdar et al. | 705/8 |
| 2008/0189778 A1 * | 8/2008 | Rowley | 726/9 |
| 2009/0013381 A1 * | 1/2009 | Torvinen et al. | 726/3 |

OTHER PUBLICATIONS

International Search Report (PCT/ISA/210) dated Mar. 16, 2009.
Written Opinion (PCT/ISA/237) dated Mar. 16, 2009.

* cited by examiner

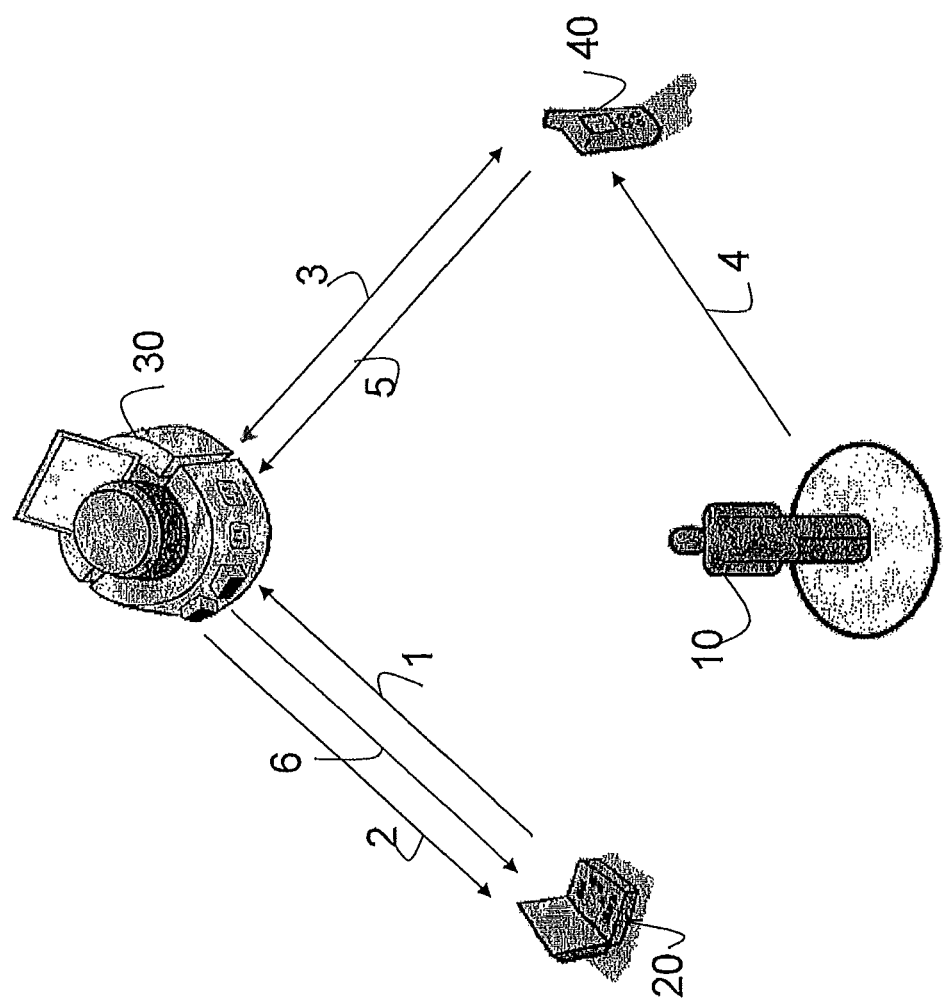

METHOD FOR AUTHENTICATING A USER ACCESSING A REMOTE SERVER FROM A COMPUTER

The invention relates to the field of securing access to on-line resources such as, for example, web services. More specifically, the present invention relates to a method allowing a user to establish mutual authentication between a remote service and the user, by means of the computer he/she uses to connect to said remote service.

In the context of the present invention, we will consider that a user wants to connect to a remote server, for example to a market service such as eBay™, to perform transactions. The performance of transactions (purchases or sales of products) requires, for security reasons, mutual authentication between the server of the site and the user. Mutual authentication is understood to mean, on the one hand, that the user must be certain that he/she is actually accessing a server of the eBay™ site (to which he/she will send personal details, such as bank details, for example) and, on the other hand, that the server of the eBay™ site must be certain that the user who wants to perform the transactions is actually the user previously registered with said site and that he/she is therefore not a fraudor.

Authentication is therefore the procedure that consists, for a computer system, of checking the identity of an entity (person, computer, etc.), in order to authorise said entity to access resources (systems, networks, applications, etc.).

Authentication therefore makes it possible to validate the authenticity of the entity in question and, unlike identification, which makes it possible to know the identity of an entity, authentication makes it possible to verify said identity.

The most frequently used solutions for authenticating a user with a remote server generally rely on a password and username combination. Said solutions have the disadvantage of being low-security, since the user may, in addition to losing his/her password and therefore no longer being able to access the server, have his/her password and username stolen. A malicious third party may then pose as the true holder of the username and password and perform transactions instead of the latter.

Another known solution consists of authenticating the user by means of a key, for example a USB key, to be inserted in the computer. Said authentication is relatively secure, but the user can still have his/her key stolen and the previously described problem is not avoided. Moreover, the key needs to be able to be inserted in the computer, which is not always possible, for example in internet cafés where users do not have access to the actual computers, but only to screen/keyboard/mouse interfaces. The same problem appears when the number of ports is restricted and no free USB ports are available. Finally, the compatibility of said type of solution is generally restricted to a reduced number of operating systems, for example only working with Microsoft™ and not with Apple™.

The same problems of theft and compatibility appear when the user wants to be authenticated by means of a smart card.

There is a known method for securing transactions by SSL 2.0. Said method is based on exchanging keys between the customer/user and a remote server. Transactions secured by SSL are carried out according to the following model:

First of all, the customer logs into to the market site secured by SSL and requests authentication.

The server, upon receiving the request, sends a certificate to the customer, containing the public key of the server, signed by a certification authority.

If the user recognises the certification authority, for example when the certification authority is included by default in the web browser certificate repositories, the user can then verify the validity of the server certificate and ensure the authenticity thereof.

The customer verifies the validity of the certificate (and therefore the authenticity of the trader) and then creates a random secret key (more precisely, a supposedly random block), encrypts said key using the public key of the server, and then sends the result (the session key) to the server.

The server can then decrypt the session key using its own private key.

Thus, the two entities are in possession of a common key that is only known to said entities. All other transactions can be performed using the session key, guaranteeing the integrity and confidentiality of the exchanged data.

The disadvantage of said solution lies in that, by default, the establishment of said channel only allows authentication in one direction: the user authenticates the server, but additional authentication is required for the server to authenticate the user.

Another known solution is described in patent application WO/03063411 entitled "Two-factor authentication method with a one-time password".

Said other solution comprises a method for authentication, with an information system, of a user having a mobile telephone which includes a data display means, a data input means and a means for reading a data medium. The mobile telephone is equipped with a smart card comprising asymmetric key applications and software for using said key. When the user sends an access request message from a sending computer terminal to the information system, the latter generates an SMS message containing a one-time password with limited validity and sends the SMS message to the user's mobile telephone. Next, the user uses the data input means of his/her mobile telephone to enter a secret personal code in the mobile telephone and submit a personal data medium to the reading means of the mobile telephone, which decrypts a private key assigned to the user, so that the mobile telephone is authorised to decode the SMS message and extract the password contained therein. Finally, the user sends, by means of the sending computer terminal, the password to the information system which authorises the access of the user.

Said solution is therefore based on the use of an SMS message encrypted by an asymmetric key. The disadvantage is that said solution requires the deployment of a proprietary infrastructure for distributing asymmetric keys which is beyond any existing system, such as public key infrastructures (PKI) based on the use of X.509 standardised digital certificates.

One of the aims of the invention is to allow a service user, typically an internet user, to access services in a straightforward, secure manner, regardless of the computer being used while providing a higher level of security than a simple username and password combination. Said computer can therefore be his/her personal computer, the computer at his/her office, the computer of an acquaintance or a friend or the computer at an internet café.

Said aim, as well as others that will subsequently become apparent, is achieved by means of a method for authenticating a user accessing a remote server from a computer, the method comprising:
- connecting to the remote server from the computer;
- logging into the remote server using a user-specific identifier;
- authenticating the remote server in the computer;
- sending an unpredictable message from the remote server to the computer;

establishing communication between the remote server and a terminal belonging to the user;

authenticating the remote server in the terminal;

authenticating the terminal in the remote server;

inviting the user to enter the unpredictable message in the terminal;

using the terminal to send the message entered by the user in the terminal to the remote server;

if the message entered by the user in the terminal matches the unpredictable message, authenticating the user in the remote server.

The aforementioned authentications are advantageously performed via the SSL protocol.

The terminal is preferably a mobile terminal including a TCP/IP SIM card.

In one advantageous embodiment of the invention, the mobile terminal is a mobile telephone.

In an alternative embodiment of the invention, the mobile terminal is a PDA.

The terminal is preferably authenticated in the remote server after the user has entered a PIN code in the terminal.

This enables the implementation of two-factor authentication.

The invention will be understood better after reading the following description of a preferred embodiment thereof, provided as a non-limiting example, and from the single enclosed FIGURE, which schematically depicts the series of steps of the method according to the invention.

According to said FIGURE, a user 10 accesses a computer 20 to connect to a remote server 30, for example an eBay™ server, previously used as an example. The user 10 also has a terminal 40, in this case made up of a mobile telephone including a SIM card (not shown) supporting an internet communications protocol, such as the TCP/IP protocol, and a secured, mutually authenticated exchange protocol, such as the SSL protocol. As will be seen below, "secured" is understood to mean an exchange protocol that allows the user 10 of the terminal 40 to be authenticated with the server 30.

The SIM card includes the certificate of the user 10 (issued by and/or trusted by the remote server) as well as a certificate from a trusted third party enabling the SIM card to trust the certificates submitted by the server 30.

To log into the server 30 of the site to be accessed, the user 10 uses the computer 20 in a conventional manner, entering the URL of the website in order to access its general home page. The user then enters his/her username (for example, his/her identifier). The connection identified by either the computer 20 or the server 30 is protected by SSL (the previously presented protocol for securing Internet exchanges), but SSL 1 authentication is unidirectional, meaning that only the identity of the server 30 is authenticated, not the identity of the user 10.

The server 30 then sends, as depicted in the diagram by an arrow 2, an unpredictable message to the user 10, for example a randomly or pseudo-randomly generated word. It is essential for the user 10 not to be able to know this message prior to receiving said message.

The server 30 then consults the profile of the user 10 and recovers the identifier of a terminal belonging to said user 10, said terminal being, in the embodiment shown, made up of the mobile telephone 40 of the user, identified by the telephone number of the SIM card contained therein. Evidently, for this to be possible, the user 10 must have previously filled in (during a previous session) his/her profile on the server 30, in other words, indicating his/her mobile telephone 40 number to the server 30.

The terminal of the user 10 is not necessarily a mobile telephone 40, for example a GSM telephone. It can also be made up of PDA containing a digital certificate.

In general terms, any device connected via TCP/IP and which can contain a certificate is suitable. The device can be any mobile terminal, such as a telephone or a PDA, containing a SIM card or not, the essential point being for the device to contain a digital certificate, for example an X.509 certificate, for mutual authentication.

Mutual authentication by SSL is then launched: the server 30 connects to the terminal 40 of the user by means of the telephone number taken from the profile of the user 10. The mechanism for establishing the TCP/IP connection to the terminal 40 by means of the user's telephone number must be supplied by the operator of the telecommunications network to which the SIM card belongs. Said mechanism is not a part of the present invention.

Said step is depicted in the diagram by arrow 3. The SIM card then authenticates the server 30 by means of the certificate thereof. The server 30 also authenticates the user 10 by means of the certificate in the SIM card. Access to this certificate may be protected by a PIN code. This makes it possible to implement two-factor authentication: something the user knows (the PIN code) and something the user owns (the SIM card or the terminal).

Said certificate is typically an ITU X.509 certificate. In the X.509 system, a certification authority assigns a certificate containing a public key to a distinguished name (DN) of the issuing certification authority, to an e-mail address or to a DNS record.

Root certificates are unsigned or self-signed pubic keys which are trusted anyway. Commercial certification authorities have root certificates included in many software applications, such as web browsers. Internet Explorer™ or Firefox™ contain a number of pre-installed root certificates.

When the browser opens a secure connection (SSL) to a site that has purchased a certificate from a known authority, the browser considers the site to be secure, and the switch to secure mode is seamless.

Said SSL connection enables the remote server to reliably authenticate the user. The TCP/IP protocol, or any other protocol that can be used for communication between the server 30 and the terminal 40, provides the interface between the SIM card and the internet/server 30.

The user 10 is then invited to enter the unpredictable message received on the computer 20 in his/her terminal 40. This entry, depicted in the diagram by 4, of said unpredictable message is, for example, carried out using the same method the user 10 regularly applies when entering an SMS message in his/her terminal.

Once the message has been entered, the message is sent (arrow 5) by the user to the server 30 and the latter authenticates the user 10 by means of the certificate contained in the SIM card.

Finally, the server 30 compares the unpredictable message sent to the computer 20 of the user with the message received via the secured SSL connection. If the message entered by the user 10 in the terminal 40 matches the unpredictable message, the user 10 is reliably authenticated in the remote server 30. The server 30 can then redirect the user 10 to a customised home page (arrow 6) and the user 10 can securely communicate with the server 30 via the computer 20.

The invention has the advantage that no mutual authentication takes place directly between the server 30 and the computer 20 used by the user 10.

The mutual authentication is performed over another channel, namely the channel established between the server 30 and a terminal 40 belonging to the user 10. The latter can therefore securely access the server 30 from any computer 20, for example from an internet café.

The invention has the advantage of establishing strong authentication using certificates (PKI) via an SSL channel with mutual authentication, avoiding all interactions with the computer used.

SSL security is not necessarily used: any other method enabling mutual authentication by certificates can be used.

However, only SSL is used by default in web browsers, and is therefore the most widespread solution.

The invention also offers the possibility of delegating authentication: take the example of a child who wants to purchase a product over the internet. The child logs into the merchant site by entering the user name of his/her parents, receives an unpredictable message and contacts (for example, by telephone) his/her parents to obtain their authorisation to purchase this product. The parents receive a message on their terminal (mobile telephone, for example) with a description of the product the child wants to purchase. The parent then enters the unpredictable message indicated by the child in his/her mobile telephone, thus authorising the child to purchase the product in question.

The telephone number of the user's terminal can be entered during a prior connection to the server or else when the user enters his/her username in the server.

Another aspect of the invention relates to loading certificates in the SIM card. There are different ways to perform said loading. Four solutions are provided below.

A first solution consists of supplying the user with a SIM card containing only a limited number of root certificates. Service providers, such as eBay™, have access to a means for inscribing user certificates in the SIM card via an OTA ("Over The Air") mechanism at the request of the user, for example when the user requests to be authenticated in the profile information supplied to eBay™.

A second solution consists of supplying the user with a SIM card containing only a certificate belonging to the user's mobile telephone operator. Service providers then request a user certificate from the operator (which becomes a certification authority) when the user requests to be authenticated in the profile information supplied to said service providers. Said user certificates are then sent OTA to the SIM card.

A third solution, similar to the preceding solution, comprises asking a trusted third party to send OTA certificates to the SIM cards. Such trusted third parties include, for example, Keynectics™ or Chambersign™, which offer their customers the provision of public key infrastructures enabling the deployment of electronic certificates.

Finally, a fourth solution comprises supplying the user with a SIM card containing a user certificate, the service provider associating the name of the issuing certification authority (DN) with the user profile when the user requests to be authenticated in the profile information supplied to said service providers.

The invention claimed is:

1. A method for authenticating a user accessing a remote server from a computer, said method comprising:
   connecting to said remote server from said computer;
   logging into said remote server using a user-specific identifier;
   authenticating said remote server in said computer;
   sending an unpredictable message from said remote server to said computer;
   selecting a terminal belonging to said user by said remote server, based on said user-specific identifier;
   sending a message from said remote server to said selected terminal;
   authenticating said remote server in said terminal, in response to said message;
   authenticating said terminal in said remote server;
   inviting said user to enter said unpredictable message in said terminal;
   using said terminal to send the message entered by said user in said terminal to said remote server;
   if the message entered by said user in said terminal matches said unpredictable message, authenticating said user in said remote server.

2. A method according to claim 1, wherein said authentications are performed via the SSL protocol.

3. A method according to claim 1, wherein said terminal is a mobile terminal including a TCP/IP SIM card.

4. A method according to claim 3, wherein said mobile terminal is a mobile telephone.

5. A method according to claim 3, wherein said mobile terminal is a PDA.

6. A method according to claim 1, wherein said terminal is authenticated in said remote server after said user has entered a PIN code in said terminal.

7. A method according to claim 2, wherein said terminal is a mobile terminal including a TCP/IP SIM card.

8. A method according to claim 7, wherein-said mobile terminal is a mobile telephone.

9. A method according to claim 7, wherein said mobile terminal is a PDA.

10. A method according to claim 2, wherein said terminal is authenticated in said remote server after said user has entered a PIN code in said terminal.

11. A method according to claim 3, wherein said terminal is authenticated in said remote server after said user has entered a PIN code in said terminal.

12. A method according to claim 4, wherein said terminal is authenticated in said remote server after said user has entered a PIN code in said terminal.

13. A method according to claim 5, wherein said terminal is authenticated in said remote server after said user has entered a PIN code in said terminal.

* * * * *